Sept. 29, 1931. J. L. PATTERSON 1,825,200
MEASURING DEVICE FOR LIQUIDS
Original Filed Sept. 3, 1924 2 Sheets-Sheet 1

Inventor
John L. Patterson,
By Dodge Sons,
Attorney

Sept. 29, 1931. J. L. PATTERSON 1,825,200
MEASURING DEVICE FOR LIQUIDS
Original Filed Sept. 3, 1924 2 Sheets-Sheet 2
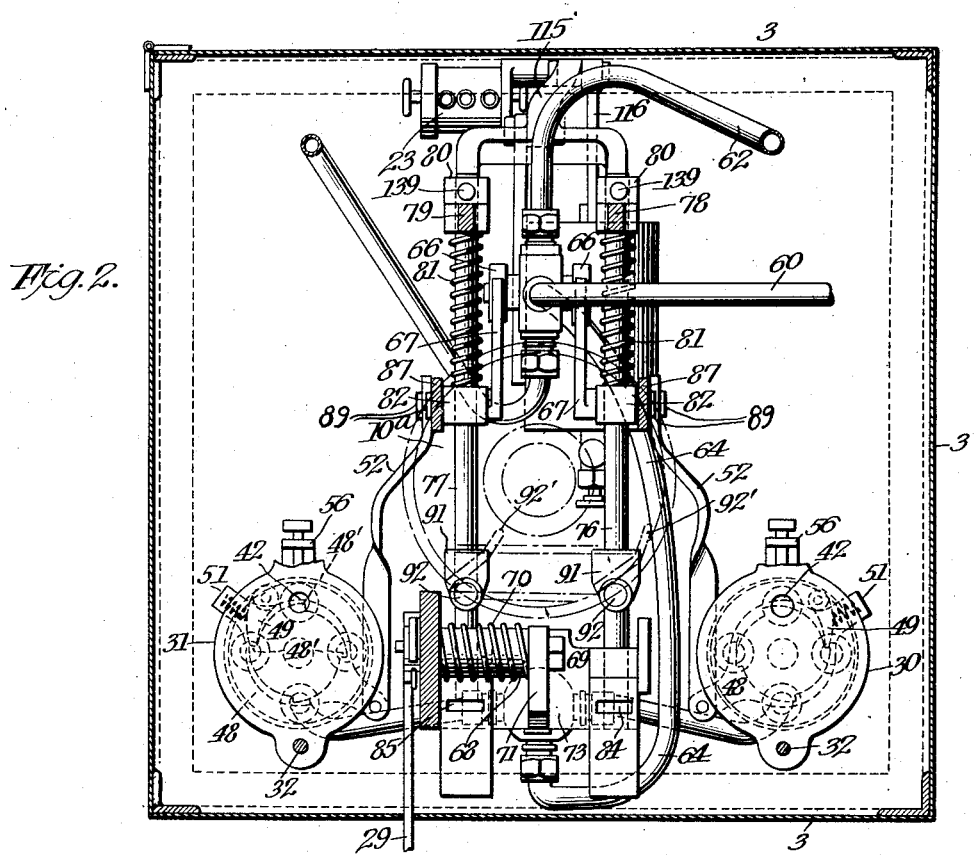
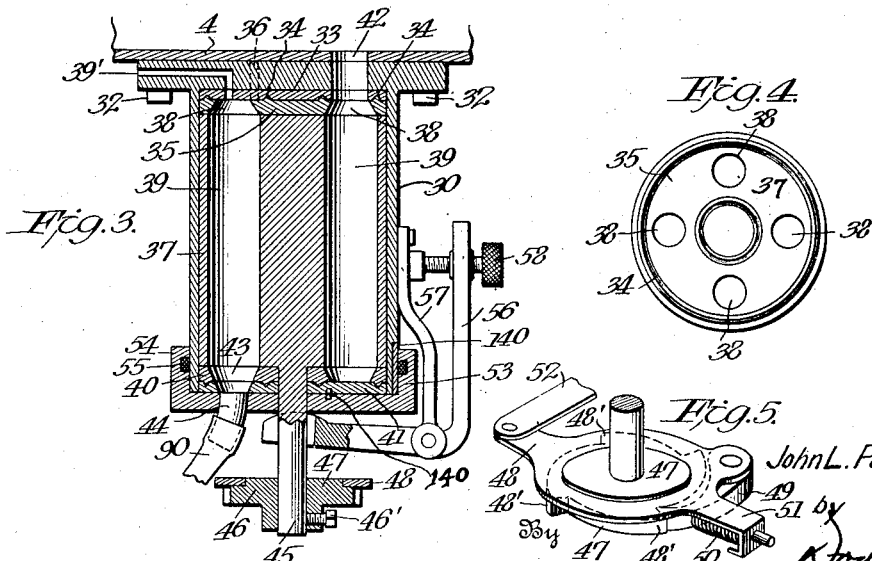
Inventor:
John L. Patterson,
By
Attorney Patented Sept. 29, 1931

1,825,200

UNITED STATES PATENT OFFICE

JOHN L. PATTERSON, OF RICHMOND, VIRGINIA, ASSIGNOR TO RICHMOND BEVERAGE MACHINE CORPORATION, OF RICHMOND, VIRGINIA, A CORPORATION OF VIRGINIA

MEASURING DEVICE FOR LIQUIDS

Original application filed September 3, 1924, Serial No. 735,613. Patent No. 1,650,151, dated November 22, 1927. Divided and this application filed October 4, 1927. Serial No. 223,956.

This invention has reference to a measuring device designed primarily for use in and as a part of an apparatus for dispensing beverages, such as carbonated water flavored with fruit syrups. The purpose of the device is to receive a suitably flavored syrup from a tank or container, and to deliver the same in accurately measured and uniform quantities or charges to cups or glasses, or to a nozzle arranged to deliver carbonated water to such cups or receptacles. It may, however, be used merely as a measuring device for liquids generally.

The present application is a division of application Serial No. 735,613, filed in my name September 3, 1924 which has eventuated in Patent No. 1,650,151 dated November 22, 1927, this divisional application being made pursuant to official requirement.

The invention is illustrated in the accompanying drawings, in which:

Fig. 2 is a top plan view of the mechanism, the casing being again shown in transverse section but on the horizontal plane 2—2 of Fig. 1;

Fig. 3 is a vertical sectional view of the measuring device per se;

Fig. 4 is a plan or face view of a disk used at top and bottom of the measuring cylinder;

Fig. 5 is a perspective view of the pawl and ratchet mechanism for imparting step-by-step rotation to said measuring cylinder.

Figure 1:
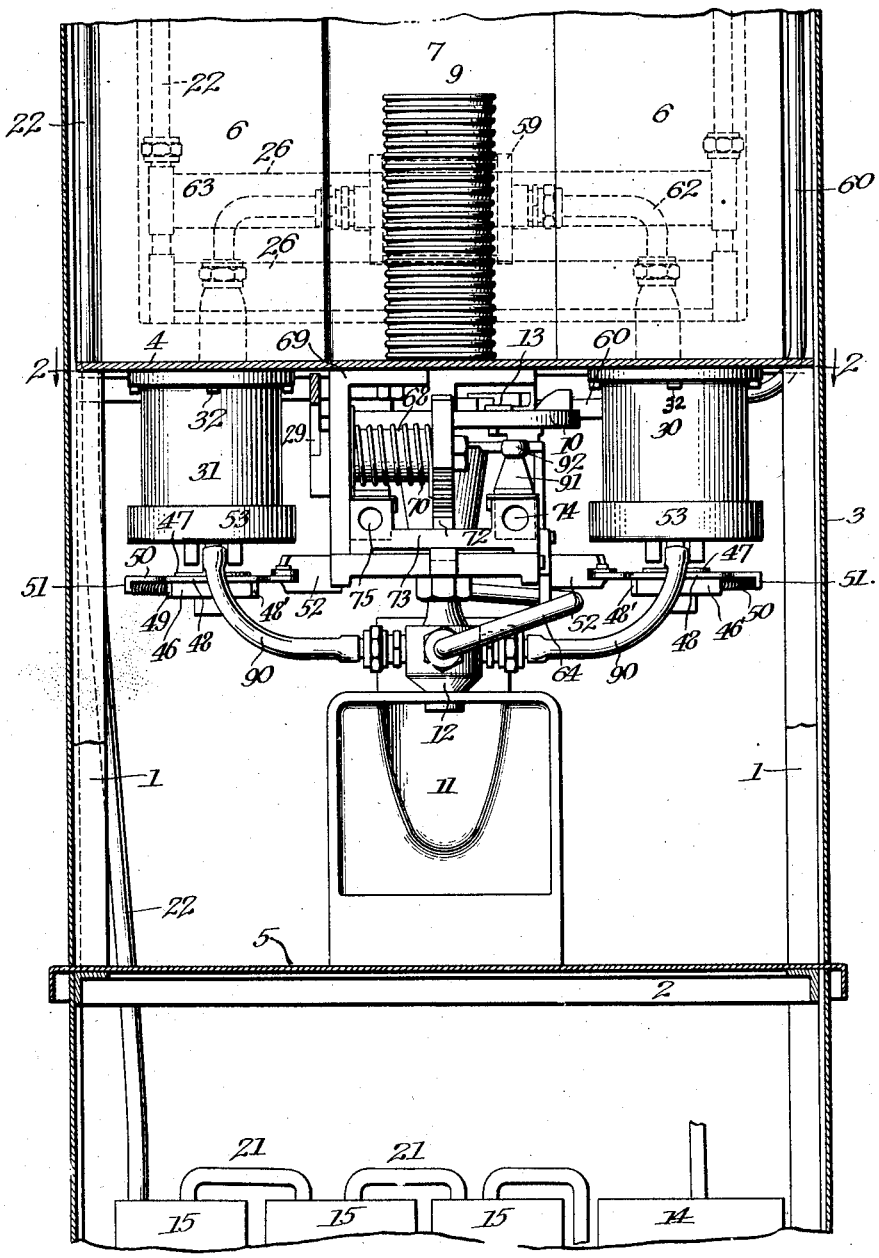
Figure 1 is a front elevation of so much of the complete liquid-dispensing apparatus as is necessary to a proper explanation of the measuring device, the housing cabinet being shown in section and broken away at top and bottom.

In practice the receiving and discharging points are in 90° relation, but are shown in Fig. 3 in 180° relation to permit both to be illustrated in the same figure.

For convenience in reading the specifications of this and the parent application in connection with each other the same designating numerals are used in both for like parts.

It is important in apparatus for dispensing beverages that the flavoring extract or syrup be accurately measured, delivered in uniform quantities, and added to or mingled with carbonated water similarly measured, to the end that the beverage so produced shall be of like character and quantity for all who patronize the machines, and however often said machines are operated. It is to attain this end that the measuring device now to be described is designed.

The complete beverage-dispensing apparatus comprises a metallic casing consisting, preferably, of four uprights or main supporting members 1 of angle iron, spaced and tied together at suitable intervals by similar but horizontally disposed angle iron bars 2, the walls 3 of sheet metal or other thin material being secured to the angle iron framing by rivets or other suitable fastenings, a door or doors being provided to afford ready access to the mechanism within the casing or cabinet. The horizontal angle irons support floors or shelves 4 and 5, carrying portions of the dispensing mechanism, while the water tank 14 and carbonating cylinders 15 may conveniently be placed in the base of the cabinet upon a floor similar to the shelves 4 and 5. Syrup tanks 6 and an ice chamber 7 are contained in the upper compartment of the cabinet, two syrup tanks being here shown for different syrups, and the dispensing mechanism being secured to the under side of the floor of said compartment. Space is left between the syrup tanks 6 and the forward side of the ice chamber 7 for a stack 9 of nested paper cups, which are delivered one at a time upon introduction of a proper coin or token through one or another slot 84 or 85. according to the syrup desired. followed by actuation of a lever 29 seen in Figs. 1 and 2. Lever 29 is carried by and serves to oscillate about its axis, a rockshaft 68 encircled by a helical spring 70, one end of which is made fast to the rockshaft and the other end of which is attached to a fixed part of the framework, as 69. Carried by and oscillatable with the rockshaft 68 is a sector gear 71, which meshes with a rack 72 carried by a sliding cross head 73 provided with openings 74 and 75 through which pass rods 76 and 77. One or the other of said rods is caused to advance with the cross head 73 through the introduction of a coin into the coin slot 84 or 85 of said cross head.

The cup-dispensing mechanism is not involved in this application and hence will not be described.

As stated, two distinct and independent syrup measuring and delivery devices are illustrated in Figs. 1 and 2, and as they are alike in all respects save that the pawl and ratchet mechanism employed is made to rotate the measuring cylinder clockwise in one case and anticlockwise in the other, description of one will apply to both.

30 and 31 indicate the outer cylinders or shells of the two cylinders illustrated, the upper end of each of which is closed by an integral head formed with a projecting flange or with ears, to receive fastening bolts or screws 32 by which to secure them to the under side of floor 4. Immediately below and in close contact with the head of each cylinder is a flat disk or gasket 33 of some suitable substance or material, such as cork, vegetable fiber, or the like, unaffected by, and incapable of injuriously affecting the syrups used, yet sufficiently yielding to permit the embedding therein of anular V-shaped ribs 34 formed on a metallic disk 35, of which there is one fitted within the top of each cylinder, and pressed firmly against the disk or gasket 33. The gasket is held by a pin 36 or equivalent means, against shifting or turning. The disk 35 forms the upper end or head of an internal cylinder 37, and has a series of circular openings 38 to register with circular chambers 39 formed in and extending from end to end of cylinder 37, parallel with its axis. As shown in Fig. 3 the openings in disk 35 are of frusto-conical form, their lower boundaries being of the same diameter as the chambers 39, while their upper boundaries are of smaller diameter. A metallic disk 40 and gasket 41 of the same form and character as disk 35 and gasket 33, and similarly held against turning, constitute the lower closure and packing of each cylinder, the V-shaped ribs of each metal disk serving to embed themselves into the contacting gasket and so to prevent entrance or passage of syrup between them, and further serving to make a liquid-tight joint of the gasket with the outer cylinder by slightly expanding the gasket at its periphery.

Each syrup tank 6 communicates by an outlet or passage 42 with the syrup cell or chamber of cylinder 37 at the time directly below it, and a like outlet 43 at the lower end of the cylinder which registers with a nipple 44, permits escape of syrup from another such cell or chamber. The inlet and outlet openings 42 and 43 are, for the purpose of showing both inlet and outlet in the one figure, here shown as on diametrically opposite sides of the cylinder axis, and as there are four chambers or cells 39 in the cylinder 37, one chamber will receive its charge at the same time that another is delivering its charge, and with the inlets and outlets in 180 degree relation, an intermediate chamber would at such time be full and ready to move to the discharging position and to begin its discharge simultaneously with commencement of the filling of the chamber at the same time reaching the filling position. In practice, however, the inlet and outlet openings are placed in 90 degree relation, to the end that each charge of syrup shall be received in cooled condition directly from the syrup tank, immediately prior to its discharge from the measuring cylinder 39. To permit the charge of syrup to leave the chamber 39 promptly and completely when said chamber registers with the outlet opening, a vent passage 39' in vertical alinement with discharge nipple 44 is formed in the head of each outer cylinder.

Mention has been made of the flaring or conoidal form of the openings 38 through disks 35 and 40, the purpose of which is to facilitate the complete filling and complete discharge of chambers 39. It is desirable to make the filling and discharge openings smaller in diameter than the chambers 39; but it has been found in practice that if the openings be smaller than the chambers and of like diameter throughout, air will collect or be pocketed in the angles encompassing said openings and will prevent the complete filling and the proper or prompt emptying of the chambers. By the construction described prompt and complete filling and emptying of the chambers 39 is ensured, and uniform syrup charges are assured.

Each inner cylinder 37 is formed or furnished with a downwardly extending stem 45 concentric with the axis of the cylinder, and serving to carry a ratchet disk 46 made fast thereto in any convenient way, a set screw 46' being shown for this purpose in Fig. 3. Ratchet disk 46 is cut away on its upper face to form a circular boss 47 concentric with the disk, and said boss is encircled by an annular pawl-carrier 48 provided with a pivoted pawl 49, the free end of which is pressed toward the periphery of disk 46 by a spring 50 carried between the downwardly turned end of a radial arm 51 of the carrier 48 and the pawl 49. (See Figs. 1, 2 and 5). The disk 46 is provided on its outer edge with a series of ratchet teeth 48', four being shown. The several teeth will in all cases be equally spaced apart, and will correspond in number with the chambers 39 in cylinder 37, with other parts constructed and arranged as here shown to advance successive chambers of the cylinder to the filling or to the discharging position by a single movement of the pawl-carrier 48 and pawl 49. Oscillating motion is transmitted to pawl-carrier 48 by a link 52 pin-jointed at one end to an ear projecting from the periphery of said carrier, and attached at its other end to a moving part of the mechanism, as later explained.

It is of course necessary to provide means for retaining in position and squarely seating the disk 40 and gasket 41, and applying adequate pressure thereto; but it is likewise desirable that these parts and the inner cylinder 37 be also readily removable from each outer cylinder for cleaning, repair, or substitution. To attain these ends there is provided as shown in Figs. 1 and 3, the annularly flanged or cup-shaped cap 53, the flange 54 of which encircles and closely fits the exterior of each cylinder 30 or 31 at its lower end, a groove 55 being formed in the inner wall of said flange to receive a gasket or packing to ensure a liquid-tight joint. A central opening is formed in the cap 53 for passage of axial stem 45 of cylinder 37 through it, and the cap may be applied and removed by hand and without the aid of tools.

To apply adequate pressure to cap 53 to seat it squarely upon cylinder 37, and to cause due embedding of the annular ribs of disk 40 into gasket 41, there is provided an L-shaped lever 56 which is fulcrumed at the junction of its arms in the lower end of a pendant bracket 57 secured at its upper end to the stationary cylinder. The horizontal arm of lever 56 is bifurcated to straddle stem 45, and both arms of the fork are formed with rounded upper faces to afford line bearings against the under face of cap 53, and to permit said cap to rock or tip thereon. Passing horizontally through a threaded hole in the upper end of the upright arm of lever 56 is a substantial screw stem 58 provided with a milled head or other means of turning it, and bearing at its other end against the bracket 57 or against the face of the cylinder. By turning the screw stem to advance it toward the cylinder it will, on obtaining a bearing thereon, force outward the upright arm of lever 56, thereby elevating the lower arm thereof and applying upward pressure to the cap 53 which, however, is free to slightly rock or tip on the rounded faces of the lever arm and thus to adapt itself nicely to the cylinder 37, and gasket 41, bringing all into close and firm bearing contact, thus embedding the annular ribs in the gaskets and pressing the gaskets firmly against the cylinder heads. By reversing the turning of the screw the cap can be relieved of pressure and removed. A vertical key 140 prevents turning of cap 53.

This manner of securing the cap overcomes a serious difficulty experienced with other modes of holding it in place, and insures tight joints with easy and free movement of the inner cylinder, all cramping and binding being avoided. This is highly important, particularly when the machine is to be manually operated. To permit cap 53 to seat itself readily upon the cylinder 37, the pipes or tubes 90 connecting the nipples 44 of the respective cylinders with discharge nozzle 12 are made of quite flexible material such as rubber, so that no appreciable resistance to ready and perfect seating shall be offered. (See Figs. 1 and 3.)

Each link 52 is slotted at the end opposite that which is pin-jointed to the pawl-carrier 48 and connected by a stud passing through said slot, with the lower end of a pendulous lever 87 suspended from a point just beneath the floor 4. Each said lever 87 is vertically slotted to receive a pin or stud 89 secured to the proximate rod 76 or 77 by screwing or otherwise. As said rods are reciprocated in one direction by the lever 29 and in the reverse direction by the spring 70 tending to lift said lever and hold it in elevated position, it follows that on each depression of said lever one or the other link 52 will be moved first rearwardly, and immediately thereafter forwardly, thus turning one or the other ratchet disk 47 and imparting a quarter revolution to the associated measuring cylinder 37.

It is of course obvious that a single measuring mechanism may be used where but one syrup is to be dispensed, and that the measuring cylinder may contain any desired number of cells or chambers, according to the size of the apparatus and the space available. Whatever be the number of cells in a measuring cylinder, the pawl and ratchet mechanism should cause a complete revolution of the cylinder at each operation of the actuating lever, where only one cell is provided, or should move said cylinder at each actuation of the lever, a number of degrees determined by dividing the total number of degrees in a circle (360) by the number of measuring cells or chambers in such cylinder. While two measuring mechanisms and two syrup tanks and attendant parts are illustrated in the accompanying drawing, and four measuring cells are shown, it is to be clearly understood that the number of measuring cells in each device, may be varied at will. The claims are therefore to be read with this understanding.

What is claimed is:—

1. A beverage-dispensing apparatus provided with a syrup-measuring device comprising an outer cylinder having an inlet opening at its top and an outlet opening in its base, and an internal cylinder provided with syrup-measuring chambers of frusto-conical form at their ends, the smaller opening of each frusto-conical passage being of the same diameter as the proximate inlet or outlet opening; whereby the pocketing of air is precluded and the chambers are caused to fill and empty completely and quickly.

2. In a beverage-dispensing apparatus, a syrup-measuring device, comprising an outer cylinder with closed upper and lower ends and having an inlet at the upper and an outlet at the lower end; a rotatable cylinder within the outer cylinder, provided with a plurality of measuring chambers; disks above and below the inner cylinder, provided with conical openings registering with and forming continuations of said chambers and with annular V-shaped ribs on their outer faces; packing gaskets interposed between the disks and the cylinder heads, the upper gasket having an opening registering with the inlet opening of the upper disk and the lower gasket having an opening registering with the outlet opening of the lower disk; and means for causing facewise pressure of the disks against the gaskets and thereby causing the annular ribs to embed themselves in the gaskets.

3. In a beverage-dispensing apparatus, a syrup-measuring device consisting of an outer cylinder having a closed head provided with a syrup-inlet; an inner cylinder provided with a plurality of measuring chambers; a flanged lower head for the outer cylinder, provided with a syrup-outlet; a bracket carried by the outer cylinder; an elbow lever fulcrumed in said bracket and having one arm provided with a rounded face to bear beneath the lower head of the cylinder; and a screw carried by the other arm of the lever and serving to cause the lower arm to apply pressure to said head and to seat and retain the same squarely and firmly against the end of the cylinder.

In testimony whereof I have signed my name to this specification.

JOHN L. PATTERSON.